United States Patent
Ogiwara

(10) Patent No.: US 7,697,266 B2
(45) Date of Patent: Apr. 13, 2010

(54) CONDUCTIVE PASTE FOR SOLID ELECTROLYTIC CAPACITOR ELECTRODE AND PROCESS FOR PRODUCING SOLID ELECTROLYTIC CAPACITOR ELECTRODE USING THE SAME

(75) Inventor: Toshiaki Ogiwara, Tochiken (JP)

(73) Assignee: E.I. du Pont de Nemours and Company, Wilmington, DE (US)

( * ) Notice: Subject to any disclaimer, the term of this patent is extended or adjusted under 35 U.S.C. 154(b) by 392 days.

(21) Appl. No.: 11/825,927

(22) Filed: Jul. 10, 2007

(65) Prior Publication Data

US 2008/0297984 A1 Dec. 4, 2008

(30) Foreign Application Priority Data

May 31, 2007 (JP) ............................. 2007-145203

(51) Int. Cl.
*H01G 9/00* (2006.01)
(52) U.S. Cl. .................. 361/523; 361/525; 361/528; 361/529; 361/516; 361/519; 29/25.01; 29/25.03
(58) Field of Classification Search .................. 361/523, 361/516–519, 525–540; 29/25.01, 25.03
See application file for complete search history.

(56) References Cited

U.S. PATENT DOCUMENTS

| 6,052,273 | A  | * | 4/2000  | Inoue et al. .................. 361/523 |
| 6,120,708 | A  | * | 9/2000  | Ohshita et al. ............... 252/511 |
| 7,256,983 | B2 | * | 8/2007  | Ozawa et al. ................ 361/519 |
| 2003/0077504 | A1 | * | 4/2003 | Hara et al. .................... 429/44 |
| 2004/0200318 | A1 | * | 10/2004 | Kim et al. ..................... 75/252 |
| 2005/0254198 | A1 | * | 11/2005 | Matsumoto et al. ......... 361/523 |
| 2006/0215354 | A1 | * | 9/2006 | Takatani et al. ............. 361/532 |

FOREIGN PATENT DOCUMENTS

| EP | 0 291 064 A2 | 11/1988 |
| EP | 0 559 427 A1 | 9/1993 |
| GB | 2 285 987 A | 8/1995 |
| JP | 1993-093741 A | 4/1993 |
| JP | 1999-135377 A | 5/1999 |

OTHER PUBLICATIONS

PCT International Search Report and Written Opinion for International Application No. PCT/US2008/064934 dated May 28, 2008.

* cited by examiner

*Primary Examiner*—Nguyen T Ha

(57) ABSTRACT

A conductive paste for a solid electrolytic capacitor electrode contains an electroconductive powder having a mean particle size of no more than 1 μm and at least 90% thereof having a particle size of at least 0.3 μm; an organic binder; and a solvent.

4 Claims, 3 Drawing Sheets

CONDUCTIVE PASTE FOR SOLID ELECTROLYTIC CAPACITOR ELECTRODE AND PROCESS FOR PRODUCING SOLID ELECTROLYTIC CAPACITOR ELECTRODE USING THE SAME

CROSS-REFERENCE TO RELATED APPLICATION

This application claims the benefit of priority under 35 U.S.C. §119 from Japan Application No. 2007-145203 which was filed on May 31, 2007.

FIELD OF INVENTION

The present invention relates to a conductive paste for a solid electrolytic capacitor electrode used in various electronic instruments and a process for producing a solid electrolytic capacitor electrode using the same.

BACKGROUND OF THE INVENTION

Conventional solid electrolytic capacitors are ones wherein an oxide film is formed by anodization on the surface of a valve action metal such as aluminum (Al), tantalum (Ta), and niobium (Nb), and a solid electrolyte such as $MnO_2$, an electroconductive polymer, and the like is used as a counter electrode. The solid electrolytic capacitor is obtained by connecting a terminal to the solid electrolytic capacitor, sealing the entirety thereof in resin, etc.

Figure 1:
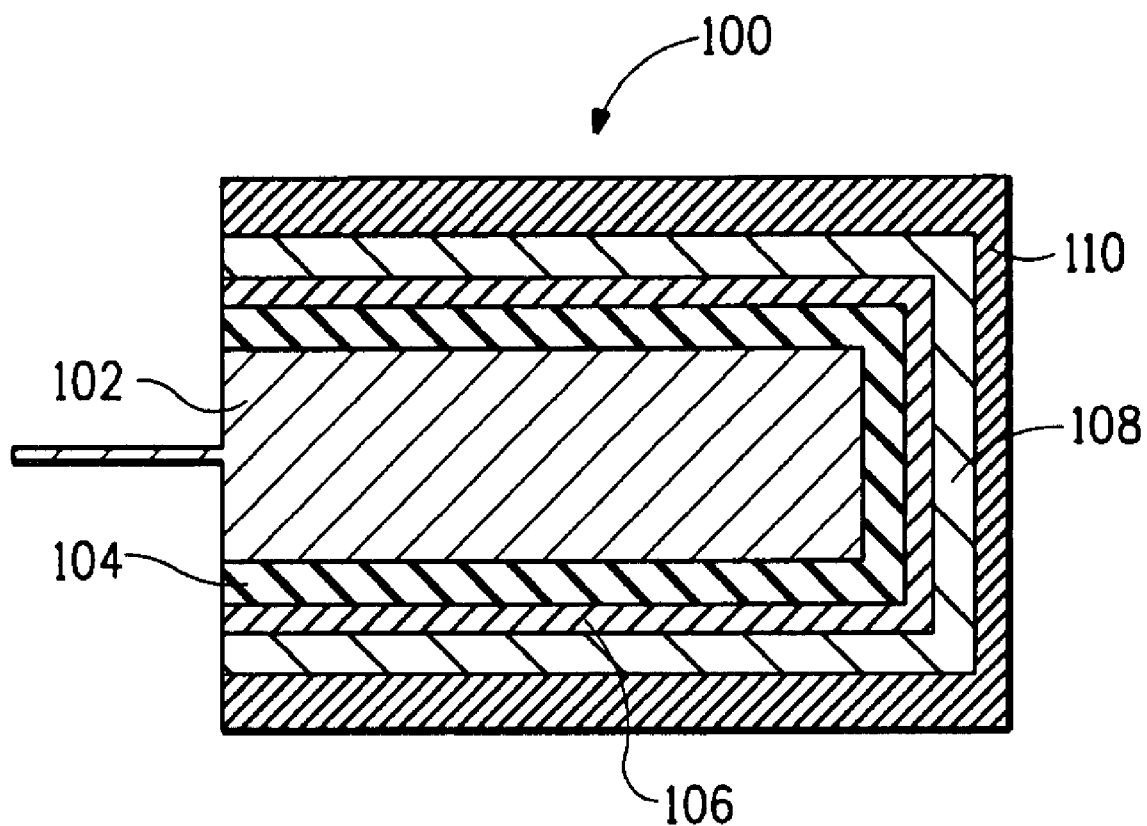
Figure 2A:
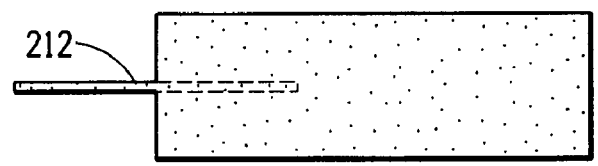
Figure 2B:
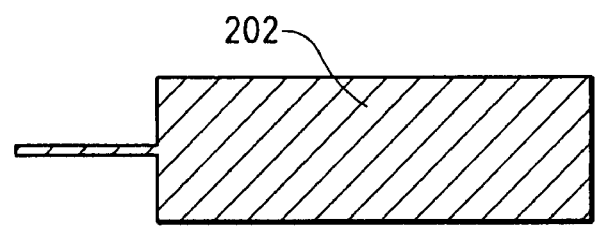
Figure 2C:
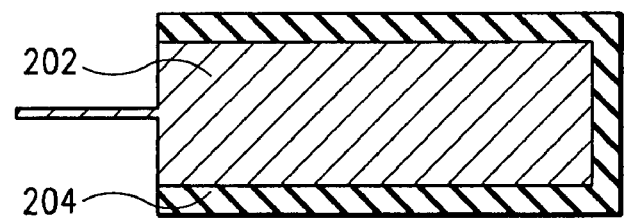
Figure 2D:
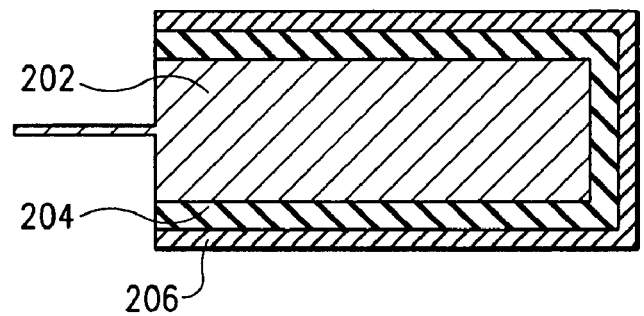

FIG. 1 is a cross-sectional view showing such a conventional solid electrolytic capacitor. The explanation below is based on this drawing.

The solid electrolytic capacitor element 100 comprises a valve action metal sintered body 102, oxide film 104, solid electrolyte layer (manganese dioxide layer) 106, graphite layer 108, and silver conductive layer 110. The valve action metal sintered body 102 is an anode, the oxide film 102 is a dielectric substance, and the solid electrolyte layer (manganese dioxide layer) 106, graphite layer 108, and silver conductive layer 110 form the counter electrode.

The role of the graphite layer 108 is believed to be as follows: (1) The graphite layer 108 intercepts oxygen, and thermal degradation due to oxidation of the solid electrolyte layer 106 is inhibited thereby; and (2) The graphite layer 108 decreases the contact resistivity between the solid electrolyte layer 106 and the silver conductive layer 110.

A reduction in ESR ("equivalent series resistivity") is being sought after as a trend in capacitor technology. To achieve lower ESR, electroconductive polymers are being used in place of the manganese dioxide that has been the raw material in conventional solid electrolyte layers. The conductivity of these electroconductive polymers is about 10 to 100 [S/cm], which is roughly 10 to 100 times higher than that of manganese dioxide.

Known attempts to reduce the ESR in a solid electrolytic capacitor have involved elimination of the graphite layer 108, and direct connection between the solid electrolyte layer 106 and the silver conductive layer 110. Theoretically, the resistivity attributable to the graphite layer 108 is eliminated thereby.

Japanese Patent Application Laid-open No. H11-135377 and No. 2005-93741 have proposed technology whereby the graphite layer 108 is eliminated, and the solid electrolyte layer 106 and silver conductive layer 110 are directly connected.

In the solid electrolytic capacitor disclosed in Japanese Patent Application Laid-open No. H11-135377, a conductive layer is formed that contains a small amount of organic compound in metal microparticles with a particle size of 10 to 500 Å (1 to 50 nm). This application asserts that because the particle size of the metal microparticles is small and a small amount of organic compound is contained therein, the metal microparticles are incorporated into the interior solid electrolyte layer, the contact surface area between the solid electrolyte layer and the conductive layer is increased, and contact resistivity is reduced thereby.

In the solid electrolytic capacitor disclosed in Japanese Patent Application Laid-open No. 2005-93741, a silver conductive layer is formed using a silver paste comprising a mixture of particles of silver powder with a mean particle size of 0.2 to 20 μm, silver nanoparticles with a mean particle size of 1 to 100 nm, and a designated binder.

It has been determined that the use of an electroconductive powder of ultrafine granules such as those disclosed in Japanese Patent Application Laid-open No. H11-135377 and No. 2005-93741 is effective in reducing the contact resistivity between the solid electrolyte layer and conductive layer, but there is also the possibility that the properties of the capacitor itself will be diminished thereby. More specifically, if the silver particles of the silver paste used to form the silver conductive layer are too fine, the silver particles can become incorporated into the interior of the capacitor, thereby causing the capacitor to short out.

It is desirable to decrease ESR and to suppress the various adverse effects.

SUMMARY OF THE INVENTION

The present invention provides means for decreasing the ESR value while suppressing adverse effects to the capacitor in a solid electrolytic capacitor wherein the solid electrolyte layer is in direct contact with the conductive layer. When the conductive paste of the present invention is used for a solid capacitor electrode, it is possible to reduce the ESR value of a solid electrolytic capacitor without the occurrence of problems such as shorting and the like.

One mode of the present invention relates to a conductive paste for a solid electrolytic capacitor electrode. This conductive paste comprises: an electroconductive powder having a mean particle size of no more than 1 μm and at least 90% thereof having a particle size of at least 0.3 μm; an organic binder; and a solvent. Preferably, in the present invention the electroconductive powder is selected from a group consisting of silver, copper, palladium, nickel, tin, aluminum, or a combination thereof.

A second mode of the present invention relates to a process for producing the electrode of the solid electrolytic capacitor using the conductive paste. This process comprises the steps of: providing an anode body having an oxide film acting as a dielectric formed on the surface thereof; forming a solid electrolyte layer on the anode body; applying, to the solid electrolyte layer, a conductive paste for a solid electrolytic capacitor electrode comprising an electroconductive powder with a mean particle size no more than 1 μm and at least 90% thereof having a particle size of at least 0.3 μm, an organic binder and a solvent, to form a conductive paste layer; and drying the conductive paste layer to form a conductive layer.

BRIEF DESCRIPTION OF THE DRAWING(S)

Figure 3A:
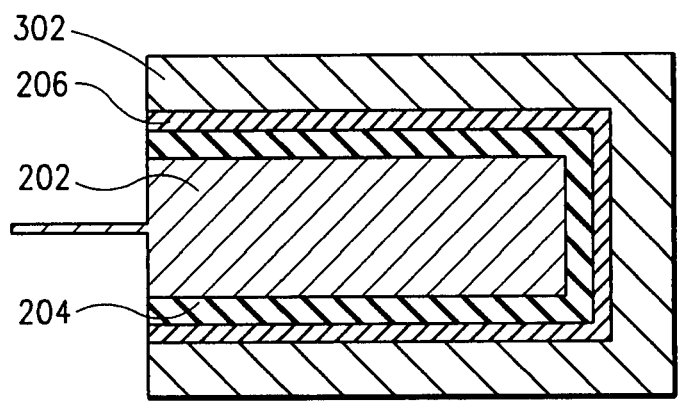
Figure 3B:
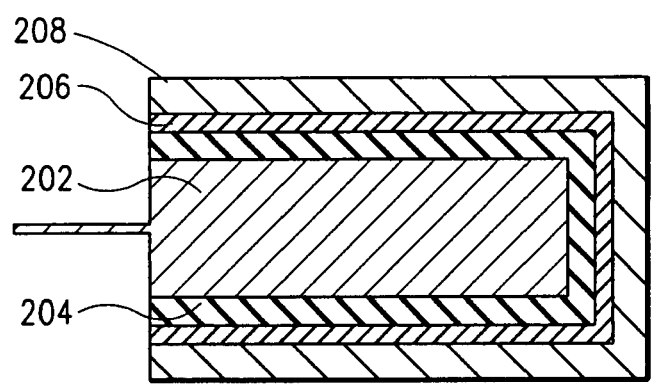
Figure 3C:
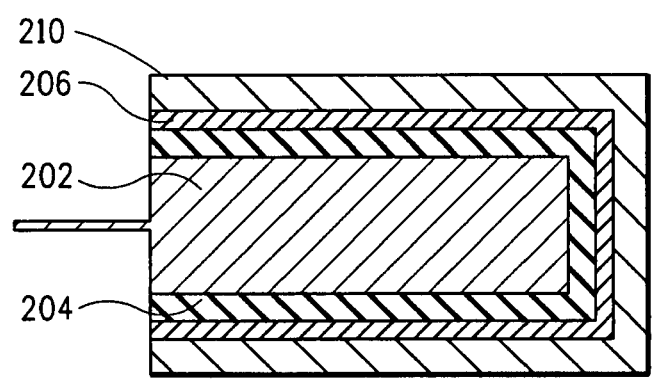

FIG. 1 is a schematic cross-sectional drawing showing the structure of a conventional solid electrolytic capacitor;

FIG. 2 (a) to (d) is a schematic cross-sectional drawing for explaining the process for producing the electrode of the solid electrolytic capacitor of the present invention; and FIG. 3 (a) to (c) is a schematic cross-sectional drawing for explaining the process for producing the electrode of the solid electrolytic capacitor of the present invention.

DETAILED DESCRIPTION OF THE INVENTION

The first mode of the present invention is a conductive paste for a solid electrolytic capacitor electrode. This conductive paste comprises 1) an electroconductive powder, 2) an organic binder and 3) a solvent. Each component thereof is explained below.

1) Electroconductive Powder

The electroconductive powder used in the present invention is not particularly limited thereby provided it is a conductive metal powder that can be used as a conductive layer of solid electrolytic capacitor electrode. For example, powdered forms of silver, copper, palladium, nickel, tin, aluminum, and the like can be used therefor. These electroconductive powders can also be used by combining a plurality of types thereof. The electroconductive powder has a mean particle size (D50) of at 1 μm or more, with at least 90% thereof having a particle size of at least 0.3 μm. Preferably, the mean particle size (D50) of the electroconductive powder is at least 0.3 μm but no more than 1 μm. Preferably, at least 90% of the electroconductive powder has a particle size of at least 0.3 μm but no more than 1 μm.

By using an electroconductive powder having a particle size of such a range, it is possible to reduce the contact resistivity between the conductive layer and the solid electrolyte layer of the capacitor electrode while also reducing the equivalent series resistivity (ESR) of the capacitor.

The shape of the electroconductive powder is not particularly limited, and, for example, various shapes such as spheres and flakes can be used, but flakes are the preferred form to be used for the conductive paste of the present invention. That is because the electromechanical properties of the capacitor tend to be improved by using an electro conductive powder of flakes.

2) Organic Binder

The organic binder in the present invention is not particularly limited. For example, thermoplastic resins such as polyacrylic resins, polyester resins, fluoropolymers, etc., and thermosetting resins such as epoxy resins, phenol aldehyde resins, urethane resins, etc., can be used either alone or in combinations thereof in the present invention.

3) Solvent

The solvent in the present invention is not particularly limited thereby provided it is a solvent that can dissolve the above organic binder. Examples include ester solvents such as butyl acetate and ethyl acetate; ketone solvents such as methyl isobutyl ketone and cyclohexanone; aromatic solvents such as toluene and xylene; and glycol ether solvents including the acetate esters thereof such as the ethylene glycol butyl ether and propylene glycol methyl ether acetate. The organic solvent can be used either alone on in combinations thereof in the present invention.

Preferably, the ratio of electroconductive powder to organic binder in the conductive paste of the present invention ranges from 95:5 to 85:15 wt %. If the content of electroconductive powder exceeds 95 wt %, the strength of the applied film of conductive layer that was formed tends to decrease. This results in a decrease in adhesion to the substrate (electroconductive polymer layer) or the conductive adhesive (adhesive for adhesion of the cathode of the solid electrolytic capacitor and the terminal for external connection) contained in the solid electrolytic capacitor. As a result, when the capacitor is assembled, peeling at the interface thereof occurs, and this becomes a cause of increased ESR.

When the content of electroconductive powder is 85 wt % or less, the resin (organic binder) that is the insulator surrounding the electroconductive powder thoroughly infiltrates the electroconductive powder, and conductive performance is not easily realized. As a result, the ESR of the capacitor rises considerably.

Preferably, the ratio of the solid contents (electroconductive powder+organic binder) to the solvent in the conductive paste of the present invention ranges from 70:30 to 50:50 wt %. If the content of solids is too great, when a component is immersed in the conductive paste, too much paste will adhere to the component and the shape will be poor after the conductive paste has been applied and dried. In this description the term "component" simply refers to an intermediate comprising an essential constituent component of a solid electrolytic capacitor, i.e., an intermediate of the valve action metal sintered body only; intermediate comprising the valve action metal sintered body and oxide film; or intermediate comprising the valve action metal sintered body, oxide film and solid electrolyte layer.

Moreover, if the content of solids is too small, the viscosity of the paste falls considerably and the solid contents easily separate from the solvent. As a result, application of the paste to a component becomes difficult. Even if application is possible, troubles arise such as the layer becoming uneven, the substrate (electroconductive polymer layer) becoming visible because the layer is too thin, and the like.

The conductive paste of the present invention can be obtained by a publicly known technique, i.e., a method wherein an electroconductive powder is thoroughly dispersed in an organic binder and solvent using a roll mill, etc. When dispersion with a roll mill is performed, it is preferable if first the electroconductive powder and organic binder are dispersed in an amount of solvent smaller than the designated amount, and then the rest of the solvent is added to obtain the designated conductive paste.

In addition to the above essential ingredients of the conductive paste of the present invention, a defoaming agent [Note 1], dispersing agent and the like can also be used as optional ingredients provided the properties of the conductive paste are not compromised thereby. Moreover, additional solvent can be added to adjust the viscosity. The amount of additive can be suitably determined by the persons skilled in the art. A plurality of additive types can also be used. The optional ingredients can be added at any time during preparation of the above conductive paste.

Next, the second mode of the present invention, the process for producing an electrode of the solid electrolytic capacitor using the above conductive paste, will be explained. This process for producing an electrode of the solid electrolytic capacitor of the present invention comprises the steps of: (a) providing an anode body having an oxide film acting as a dielectric formed on the surface thereof; (b) forming a solid electrolyte layer on the above anode body; (c) applying, to the above solid electrolyte layer, a conductive paste for a solid electrolytic capacitor electrode comprising an electroconductive powder with a mean particle size no more than 1 μm and at least 90% thereof having a particle size of at least 0.3 μm, an organic binder and a solvent, to form a conductive paste layer; and (d) drying the above conductive paste layer to form a conductive layer.

FIG. 2 (*i*) to (*iv*) and FIG. 3 (*i*) to (*iii*) are schematic drawings for explaining the process for producing the above electrode of the solid electrolytic capacitor.

(a) First Process (FIG. 2 (*i*) to (*iii*))

The first process is the step of providing an anode body having an oxide film acting as a dielectric formed on the surface thereof. First tantalum powder is pressed press molded into a designated shape, a hexahedron for example, to form an anode lead wire 212 made of tantalum (FIG. 2(*i*)). Next, the press-molded body obtained thereby is sintered to obtain an anode body 202 (FIG. 2(*ii*)). A dielectric oxide film 204 is formed on the surface of the anode body 202 obtained thereby (FIG. 2(*iii*)). A publicly known process can be used for forming the oxide film. For example, a process can be used wherein the anode body is immersed in an electrolyte solution such as an aqueous phosphoric acid solution to oxidize the anode.

Examples of a raw material for the anode body in addition to tantalum include aluminum or niobium oxide. When niobium oxide is used as the anode body, a niobium oxide component having an oxide film can be obtained by the above process. Moreover, when aluminum is used, an anode body wherein an oxide film is formed on the surface of aluminum foil can be used.

(b) Second Process (FIG. 2(*iv*))

The second process is the step of forming a solid electrolyte layer 206 on the dielectric oxide film 204 of the anode body 202 having a dielectric oxide film obtained in the first process above. In this explanation, an example of a case wherein an electroconductive polymer is used as the solid electrolyte layer will be described.

The electroconductive polymer is an organic polymer conductivity, and examples include polythiophene, polypyrrole, polyaniline, polyphenylene vinylene or derivatives thereof. These electroconductive polymers are generally obtained by chemical polymerization.

Thiophene or a derivative thereof is most suitable as the monomer of the electroconductive polymer. When polymerized, not only is the conductivity thereof higher than in other electroconductive polymers such as polypyrroles or polyanilines, but also thermostability is particularly good, thus enabling a solid electrolytic capacitor with low ESR and excellent thermal resistivity properties to be obtained. The thiophene derivatives listed in Japanese Patent Application Laid-open No. 2005-93741 [Note 2] described above can serve as examples of a thiophene derivative, and more specifically, 3, 4-ethylenedioxythiophene is a good example thereof.

The following procedure, for example, can be adopted to form solid electrolyte layer 206 on the anode body 202 having a dielectric oxide film 204.

First a monomer solution of the electroconductive polymer is prepared. The monomer solution of the electroconductive polymer is a dilution of the monomer of the electroconductive polymer in a designated solvent. The viscosity of the polymerizable monomer solution is decreased by dilution thereof, thus facilitating infiltration of the polymerizable monomer into the capacitor. Various organic solvents can be used as the solvent, but when 3, 4-ethylenedioxythiophene is used as monomer of the electroconductive polymer, isopropyl alcohol is most suitable.

The anode body 202 having a dielectric oxide film 204 is immersed in the electroconductive polymer monomer solution for a predetermined time, and then the anode body is raised and let stand in the air to remove the solvent.

Next, the obtained component is immersed in an oxidizing agent solution. For this oxidizing agent solution a solution can be used wherein a persulfate such as ammonium persulfate and a sulfonate is dissolved in a designated solvent such as pure water. The polymerization of the monomer of the electroconductive polymer progresses by immersion in this oxidizing agent solution, and becomes a macromolecule.

Next, the anode body whereupon a solid electrolyte layer has been formed, is washed by a stream of pure water. Then the obtained component is dried.

By repeating the process of immersing and drying the electroconductive polymer monomer solution a plurality of times, a solid electrolyte layer comprising an electroconductive polymer of a desired thickness is obtained.

(c) Third Process (FIG. (3(*i*) to (*ii*))

The third process is the step of applying a conductive paste 208 comprising: an electroconductive powder having a mean particle size of no more than 1 μm and at least 90% thereof having a particle size of at least 0.3 μm; an organic binder; and a solvent to the component with the solid electrolyte layer 206 obtained in the second process to form a conductive paste layer 208 thereon.

This process is performed by immersing the component whereupon the solid electrolyte layer 206 has been formed in the conductive paste 302 of the present invention described above (FIG. 3(*i*)). The element is raised after immersion for a predetermined time, and the conductive paste is dried (FIG. 3(*ii*)). This explanation uses immersion as an example, but other methods such as application by brush, roller coating, spray coating and the like can also be used.

d) Fourth Process (FIG. 3(*iii*))

The fourth process is the step of drying the conductive paste layer of the component obtained in the third process to obtain a conductive layer 210. Usually, heat is used for drying.

Preferably, the drying of the conductive paste can be performed at 100 to 200° C., preferably 120 to 160° C. using an apparatus such as a box oven [Note 3] or continuous belt oven.

As described above, a counter electrode (cathode) can be formed on the anode body having the dielectric oxide film.

EXAMPLES

The present invention is explained in detail below with examples, but these examples are merely illustrations and are not intended to limit the present invention thereto.

Example 1

A total of 57.5 parts of silver powder having a mean particle size of 0.54 μm with at least 90% of the totality thereof being at least 0.39 μm and 42.5 parts of a 15% solution of acrylic resin (Elvacite 2041 manufactured by Lucite International Inc.) in cyclohexanone (Kanto Chemical Co., Inc.) were measured out and preliminarily mixed in an agitating mixer. The preliminary mixture obtained thereby was additionally kneaded thoroughly with a 3-roll kneader to obtain a liquid dispersion of silver powder. An additional 35 parts of cyclohexanone was added to 100 parts of this liquid dispersion to prepare a liquid dispersion of silver powder with a viscosity of 4,200 mPa·s.

Next tantalum powder was sintered to form a tantalum pentoxide film, and the tantalum capacitor component having electroconductive polymer applied thereto was immersed in the above liquid dispersion of silver powder to adhere the liquid dispersion of silver powder to the surface thereof by immersion. After the component was dried for 30 minutes at normal temperature, heat drying was performed for 60 min at 140° C. to form a cathode on the tantalum capacitor component. When the equivalent series resistivity (ESR) of the tantalum capacitor component prepared thereby was measured at a frequency of 100 kHz using a Hewlett-Packard 4284A precision LCR meter, it was found to be 9 mΩ. When the leakage current of the component was measured at an applied voltage of 2.5 V for 20 sec using a Hewlett-Packard 4339B high resistivity meter, no shorting of the capacitor was found, and the current value was 1.5 µA.

Example 2

A total of 70.2 parts of the silver powder used in Example 1 and 29.8 parts of the 15% solution of acrylic resin in cyclohexanone (Kanto Chemical Co., Inc.) used in Example 1 were measured out and preliminary mixed in an agitating mixer. The preliminary mixture obtained thereby was additionally kneaded thoroughly with a 3-roll kneader to obtain a liquid dispersion of silver powder. An additional 30 parts of cyclohexanone was added to 100 parts of this liquid dispersion to prepare a liquid dispersion of silver powder with a viscosity of 8,000 mPa·s.

Next tantalum powder was sintered to form a tantalum pentoxide film, and the tantalum capacitor component having electroconductive polymer applied thereto was immersed in the above liquid dispersion of silver powder to adhere the liquid dispersion of silver powder to the surface thereof by immersion. After the component was dried for 30 minutes at normal temperature, heat drying was performed for 60 min at 140° C. to form a cathode on the tantalum capacitor component. When the equivalent series resistivity (ESR) of the tantalum capacitor component prepared thereby was measured at a frequency of 100 kHz using a Hewlett-Packard 4284A precision LCR meter, it was found to be 10 mΩ. When the leakage current of the component was measured at an applied voltage of 2.5 V for 20 sec using a Hewlett-Packard 4339B high resistivity meter, no shorting of the capacitor was found, and the current value was 3.9 µA.

Example 3

A total of 48.0 parts of the silver powder used in Example 1 and 52.0 parts of the 15% solution of acrylic resin in cyclohexanone (Kanto Chemical Co., Inc.) used in Example 1 were measured out and preliminary mixed in an agitating mixer. The preliminary mixture obtained thereby was additionally kneaded thoroughly with a 3-roll kneader to obtain a liquid dispersion of silver powder. An additional 40 parts of cyclohexanone was added to 100 parts of this liquid dispersion to prepare a liquid dispersion of silver powder with a viscosity of 2,600 mPa·s.

Next tantalum powder was sintered to form a tantalum pentoxide film, and the tantalum capacitor component having electroconductive polymer applied thereto was immersed in the above liquid dispersion of silver powder to adhere the liquid dispersion of silver powder to the surface thereof by immersion. After the component was dried for 30 minutes at normal temperature, heat drying was performed for 60 min at 140° C. to form a cathode on the tantalum capacitor component. When the equivalent series resistivity (ESR) of the tantalum capacitor component prepared thereby was measured at a frequency of 100 kHz using a Hewlett-Packard 4284A precision LCR meter, it was found to be 9 mΩ. When the leakage current of the component was measured at an applied voltage of 2.5 V for 20 sec using a Hewlett-Packard 4339B high resistivity meter, no shorting of the capacitor was found, and the current value was 1.7 µA.

Example 4

A total of 73 g of silver powder having a mean particle size of 0.7 µm with 90% of the totality thereof being at least 0.43 µm and 27 g of a 30% solution of PKHZ phenoxy resin (manufactured by InChem Corp.) in cyclohexanone (Kanto Chemical Co., Inc.) were measured out and preliminarily mixed in an agitating mixer. The preliminary mixture was additionally kneaded thoroughly with a 3-roll kneader to obtain a liquid dispersion of silver powder. An additional 20 g of cyclohexanone was added to 100 g of this liquid dispersion to prepare a liquid dispersion of silver powder with a viscosity of 2,100 mPa·s.

Next tantalum powder was sintered to form a tantalum pentoxide film, and the tantalum capacitor component having electroconductive polymer applied thereto was immersed in the above liquid dispersion of silver powder to adhere the liquid dispersion of silver powder to the surface thereof by immersion. After the component was dried for 30 minutes at normal temperature, heat drying was performed for 60 min at 140° C. to form a cathode on the tantalum capacitor component. When the equivalent series resistivity (ESR) of the tantalum capacitor component prepared thereby was measured at a frequency of 100 kHz using a Hewlett-Packard 4284A precision LCR meter, it was found to be 9 mΩ. When the leakage current of the component was measured at an applied voltage of 2.5 V for 20 sec using a Hewlett-Packard 4339B high resistivity meter, no shorting of the capacitor was found, and the current value was 1.5 µA.

Example 5

A total of 57.5 g of the silver powder used in Example 1 and 42.5 g of a 15% solution of acrylic resin (Elvacite 2041 manufactured by Lucite International Inc.) in propylene glycol methyl ether acetate were measured out and preliminary mixed in an agitating mixer. The preliminary mixture was additionally kneaded thoroughly with a 3-roll kneader to obtain a liquid dispersion of silver powder. Additionally, 20 g of cyclohexanone (Kanto Chemical Co., Inc.) was added to 100 g of this liquid dispersion to prepare a liquid dispersion of silver powder with a viscosity of 2,500 mPa·s.

Next tantalum powder was sintered to form a tantalum pentoxide film, and the tantalum capacitor component having electroconductive polymer applied thereto was immersed in the above liquid dispersion of silver powder to adhere the liquid dispersion of silver powder to the surface thereof by immersion. After the component was dried for 30 minutes at normal temperature, heat drying was performed for 60 min at 140° C. to form a cathode on the tantalum capacitor component. When the equivalent series resistivity (ESR) of the tantalum capacitor component prepared thereby was measured at a frequency of 100 kHz using a Hewlett-Packard 4284A precision LCR meter, it was found to be 9 mΩ. When the leakage current of the component was measured at an applied voltage of 2.5 V for 20 sec using a Hewlett-Packard 4339B high resistivity meter, no shorting of the capacitor was found, and the current value was 1.5 µA.

Example 6

A total of 57.5 g of silver powder having a mean particle size of 0.48 μm with 90% of the totality thereof being at least 0.36 μm and 42.5 g of a 15% solution of acrylic resin (Elvacite 2041 manufactured by Lucite International Inc.) in propylene glycol methyl ether acetate were measured out and preliminarily mixed in an agitating mixer. The preliminary mixture was additionally kneaded thoroughly with a 3-roll kneader to obtain a liquid dispersion of silver powder. Additionally, 20 g of cyclohexanone was added to 100 g of this liquid dispersion to prepare a liquid dispersion of silver powder with a viscosity of 2,700 mPa·s.

Next tantalum powder was sintered to form a tantalum pentoxide film, and the tantalum capacitor component having electroconductive polymer applied thereto was immersed in the above liquid dispersion of silver powder to adhere the liquid dispersion of silver powder to the surface thereof by immersion. After the component was dried for 30 minutes at normal temperature, heat drying was performed for 60 min at 140° C. to form a cathode on the tantalum capacitor component. When the equivalent series resistivity (ESR) of the tantalum capacitor component prepared thereby was measured at a frequency of 100 kHz using a Hewlett-Packard 4284A precision LCR meter, it was found to be 9 mΩ. When the leakage current of the component was measured at an applied voltage of 2.5 V for 20 sec using a Hewlett-Packard 4339B high resistivity meter, no shorting of the capacitor was found, and the current value was 1.3 μA.

Comparative Example 1

A total of 73 g of silver powder having a mean particle size of 1.2 μm with 90% of the totality thereof being at least 0.9 μm and 27 g of a 30% solution of PKHZ phenoxy resin (manufactured by InChem Corp.) in cyclohexanone (Kanto Chemical Co., Inc.) were measured out and preliminarily mixed in an agitating mixer. The preliminary mixture was additionally kneaded thoroughly with a 3-roll kneader to obtain a liquid dispersion of silver powder. An additional 20 g of cyclohexanone (Kanto Chemical Co., Inc.) was added to 100 g of this liquid dispersion to prepare a liquid dispersion of silver powder with a viscosity of 2,100 mPa·s.

Next tantalum powder was sintered to form a tantalum pentoxide film, and the tantalum capacitor component having electroconductive polymer applied thereto was immersed in the above liquid dispersion of silver powder to adhere the liquid dispersion of silver powder to the surface thereof by immersion. After the component was dried for 30 minutes at normal temperature, heat drying was performed for 60 min at 140° C. to form a cathode on the tantalum capacitor component. When the equivalent series resistivity (ESR) of the tantalum capacitor component prepared thereby was measured at a frequency of 100 kHz using a Hewlett-Packard 4284A precision LCR meter, it was found to be 13 mΩ. When the leakage current of the component was measured at an applied voltage of 2.5 V for 20 sec using a Hewlett-Packard 4339B high resistivity meter, no shorting of the capacitor was found, and the current value was 17 μA.

Comparative Example 2

A total of 73 g of silver powder having a mean particle size of 0.6 μm with 90% of the totality thereof being at least 0.2 μm and 27 g of a 30% solution of PKHZ phenoxy resin (manufactured by InChem Corp.) in cyclohexanone (Kanto Chemical Co., Inc.) were measured out and preliminarily mixed in an agitating mixer. The preliminary mixture was additionally kneaded thoroughly with a 3-roll kneader to obtain a liquid dispersion of silver powder. An additional 20 g of cyclohexanone was added to 100 g of this liquid dispersion to prepare a liquid dispersion of silver powder with a viscosity of 2,300 mPa·s [Note 4].

Next tantalum powder was sintered to form a tantalum pentoxide film, and the tantalum capacitor component having electroconductive polymer applied thereto was immersed in the above liquid dispersion of silver powder to adhere the liquid dispersion of silver powder to the surface thereof by immersion. After the component was dried for 30 minutes at normal temperature, heat drying was performed for 60 min at 140° C. to form a cathode on the tantalum capacitor component. When the equivalent series resistivity (ESR) of the tantalum capacitor component prepared thereby was measured at a frequency of 100 kHz using a Hewlett-Packard 4284A precision LCR meter, it was found to be 8 mΩ. When the leakage current of the component was measured at an applied voltage of 2.5 V for 20 sec using a Hewlett-Packard 4339B high resistivity meter, shorting of the capacitor was found.

Comparative Example 3

A total of 57.5 g of the silver powder used in Comparative Example 2 and 42.5 g of a 15% solution of acrylic resin (Elvacite 2041 manufactured by Lucite International Inc.) in propylene glycol methyl ether acetate were measured out and preliminarily mixed in an agitating mixer. The preliminary mixture was additionally kneaded thoroughly with a 3-roll kneader to obtain a liquid dispersion of silver powder. An additional 20 g of cyclohexanone (Kanto Chemical Co., Inc.) was added to 100 g of this liquid dispersion to prepare a liquid dispersion of silver powder with a viscosity of 3,600 mPa·s.

Next tantalum powder was sintered to form a tantalum pentoxide film, and the tantalum capacitor component having electroconductive polymer applied thereto was immersed in the above liquid dispersion of silver powder to adhere the liquid dispersion of silver powder to the surface thereof by immersion. After the component was dried for 30 minutes at normal temperature, heat drying was performed for 60 min at 140° C. to form a cathode on the tantalum capacitor component. When the equivalent series resistivity (ESR) of the tantalum capacitor component prepared thereby was measured at a frequency of 100 kHz using a Hewlett-Packard 4284A precision LCR meter, it was found to be 10 mo. When the leakage current of the component was measured at an applied voltage of 2.5 V for 20 sec using a Hewlett-Packard 4339B high resistivity meter, shorting of the capacitor was found.

RESULTS

The results of Examples 1 to 6 [Note 5] and Comparative Examples 1 to 3 above are summarized in Table 1.

TABLE 1

| | Silver powder | | | | | | |
|---|---|---|---|---|---|---|---|
| | Mean Particle size (μm) | Particle size of at least 90% (μm) | Resin | Silver powder:Resin (wt ratio) | Viscosity of silver powder dispersion (mPa · s) | ESR (mΩ) | Leakage current (μA) |
| Example 1 | 0.54 | 0.39 | Acrylic resin | 90:10 | 4,200 | 9 | 1.5 |
| Example 2 | 0.54 | 0.39 | Acrylic resin | 94:6 | 8,000 | 10 | 3.9 |
| Example 3 | 0.54 | 0.39 | Acrylic resin | 86:14 | 2,600 | 9 | 1.7 |
| Example 4 | 0.70 | 0.43 | Phenoxy resin | 90:10 | 2,100 | 9 | 1.5 |
| Example 5 | 0.70 | 0.43 | Acrylic resin | 90:10 | 2,500 | 9 | 1.5 |
| Example 6 | 0.48 | 0.36 | Acrylic resin | 90:10 | 2,700 | 9 | 1.3 |
| Comparative example 1 | 1.20 | 0.90 | Phenoxy resin | 94:6 | 2,100 | 13 | 17 |
| Comparative example 2 | 0.60 | 0.20 | Phenoxy resin | 94:6 | 2,300 | 8 | Short |
| Comparative example 3 | 0.60 | 0.20 | Acrylic resin | 90:10 | 3,600 | 10 | Short |

As can be seen from the Examples and Comparative Examples, when the mean particle size of the conductive powder becomes 1 μm or more, the ESR of the capacitor becomes worse, and when at least 90% of the totality of the conductive powder has a particle size of no more than 0.3 μm, the leakage current of the capacitor increases and the capacitor shorts out.

What is claimed is:

1. A process for producing an electrode of a solid electrolytic capacitor, comprising the steps of:
    providing an anode body having an oxide film acting as a dielectric formed on the surface thereof;
    forming a solid electrolyte layer on the anode body;
    applying, directly to the solid electrolyte layer, a conductive paste for a solid electrolytic capacitor electrode comprising an electroconductive powder with a mean particle size no more than 1 μm and at least 90% thereof having a particle size of at least 0.3 μm, an organic binder and a solvent, to form a conductive paste layer; and
    drying the conductive paste layer to form a conductive layer.

2. The process for producing the electrode of a solid electrolytic capacitor according to claim 1, wherein the anode body is selected from the group consisting of tantalum, niobium oxide, aluminum and a mixture thereof.

3. The process for producing the electrode of a solid electrolytic capacitor according to claim 1, wherein the organic binder in the conductive paste is selected from the group consisting of thermoplastic resins, thermosetting resins and a mixture thereof.

4. The process for producing the electrode of a solid electrolytic capacitor according to claim 1, wherein the electroconductive powder in the conductive paste is in the form of flakes.

* * * * *